(12) United States Patent
Osburn, III

(10) Patent No.: US 8,935,523 B1
(45) Date of Patent: *Jan. 13, 2015

(54) CRYPTOGRAPHIC PROTECTED COMMUNICATION SYSTEM WITH MULTIPLEXED CRYPTOGRAPHIC CRYPTOPIPE MODULES

(71) Applicant: DJ Inventions, LLC, Houston, TX (US)

(72) Inventor: Douglas C. Osburn, III, Houston, TX (US)

(73) Assignee: DJ Inventions, LLC, Houston, TX (US)

( * ) Notice: Subject to any disclaimer, the term of this patent is extended or adjusted under 35 U.S.C. 154(b) by 197 days.

This patent is subject to a terminal disclaimer.

(21) Appl. No.: 13/710,606

(22) Filed: Dec. 11, 2012

Related U.S. Application Data

(63) Continuation-in-part of application No. 13/552,396, filed on Jul. 18, 2012, now Pat. No. 8,364,950.

(51) Int. Cl.
| | |
|---|---|
| *G06F 9/00* | (2006.01) |
| *H04L 9/28* | (2006.01) |
| *H04L 9/08* | (2006.01) |
| *H04L 29/06* | (2006.01) |

(52) U.S. Cl.
CPC . *H04L 9/28* (2013.01); *H04L 63/20* (2013.01); *H04L 9/0838* (2013.01)
USPC ........... 713/153; 713/189; 713/192; 713/194; 726/4

(58) Field of Classification Search
CPC ............. H04L 9/00; H04L 9/002; H04L 9/08; H04L 9/088; H04L 9/0816; H04L 63/00; H04L 63/06; H04L 63/08; H04L 63/0464; H04L 63/0435; H04L 63/0442; H04L 61/203; H04L 41/28
USPC ........................ 713/153, 189, 194, 201; 726/4
See application file for complete search history.

(56) References Cited

U.S. PATENT DOCUMENTS

| | | | |
|---|---|---|---|
| 5,638,378 A | 6/1997 | Scop et al. | |
| 5,719,771 A | 2/1998 | Buck et al. | |
| 5,745,384 A | 4/1998 | Lanzerotti et al. | |
| 5,794,009 A | 8/1998 | Coleman et al. | |
| 5,812,394 A | 9/1998 | Lewis et al. | |
| 6,032,154 A | 2/2000 | Coleman et al. | |
| 6,411,987 B1 | 6/2002 | Steger et al. | |
| 6,628,992 B2 | 9/2003 | Osburn, III | |
| 6,658,349 B2 | 12/2003 | Cline | |
| 6,687,573 B2 | 2/2004 | Egolf et al. | |
| 6,751,562 B1 | 6/2004 | Blackett et al. | |
| 6,950,851 B2 | 9/2005 | Osburn, III | |
| 6,961,753 B1 | 11/2005 | Osburn, III | |
| 7,073,183 B2 | 7/2006 | Hekizono | |
| 7,185,362 B2 * | 2/2007 | Hawkes et al. | 726/4 |
| 7,225,248 B1 | 5/2007 | Osburn, III | |
| 7,286,914 B2 | 10/2007 | Cerchione et al. | |

(Continued)

FOREIGN PATENT DOCUMENTS

JP    53098861    8/1978

*Primary Examiner* — Thu Ha Nguyen
(74) *Attorney, Agent, or Firm* — Buskop Law Group, PC; Wendy Buskop

(57) ABSTRACT

An auditable cryptographic protected communication system for connecting an enterprise server to a plurality of industrial devices using messaging protocols for each industrial device enabling the industrial devices to receive commands and transmit status and measurement data using the individual device messaging protocols over a network.

20 Claims, 5 Drawing Sheets

(56) References Cited

U.S. PATENT DOCUMENTS

| | | |
|---|---|---|
| 7,587,481 B1 | 9/2009 | Osburn, III |
| 7,646,298 B1 | 1/2010 | Osburn, III et al. |
| 7,673,337 B1 | 3/2010 | Osburn, III |
| 7,673,338 B1 | 3/2010 | Osburn, III et al. |
| 7,685,436 B2 * | 3/2010 | Davis et al. .................. 713/192 |
| 7,747,710 B1 | 6/2010 | Osburn, III et al. |
| 8,009,829 B2 * | 8/2011 | Jueneman et al. .............. 380/28 |
| 8,281,126 B2 * | 10/2012 | Noble et al. .................. 713/153 |
| 8,316,232 B1 | 11/2012 | Osburn, III |
| 8,464,053 B2 * | 6/2013 | Davis et al. .................. 713/168 |
| 2002/0107804 A1 * | 8/2002 | Kravitz .......................... 705/51 |
| 2002/0172367 A1 * | 11/2002 | Mulder et al. ................ 380/277 |
| 2003/0039361 A1 * | 2/2003 | Hawkes et al. .............. 380/278 |
| 2004/0217900 A1 | 11/2004 | Martin et al. |
| 2004/0244265 A1 | 12/2004 | Miyata et al. |
| 2005/0138120 A1 | 6/2005 | Gundersen et al. |
| 2005/0177749 A1 * | 8/2005 | Ovadia .......................... 713/201 |
| 2005/0185638 A1 * | 8/2005 | Begis ............................ 370/352 |
| 2006/0037041 A1 * | 2/2006 | Zhang ............................ 725/32 |
| 2007/0116282 A1 * | 5/2007 | Hawkes et al. ................ 380/239 |
| 2007/0288743 A1 * | 12/2007 | Cam-Winget et al. ........ 713/150 |
| 2008/0130895 A1 * | 6/2008 | Jueneman et al. ............ 380/277 |
| 2009/0063858 A1 * | 3/2009 | Davis et al. .................. 713/168 |
| 2009/0210696 A1 * | 8/2009 | Moreau ........................ 713/151 |
| 2010/0095110 A1 * | 4/2010 | Noble et al. .................. 713/153 |
| 2011/0022835 A1 * | 1/2011 | Schibuk ........................ 713/153 |
| 2011/0213969 A1 * | 9/2011 | Nakhjiri et al. .............. 713/158 |
| 2012/0278634 A1 * | 11/2012 | Luukkala et al. ............. 713/189 |
| 2014/0281486 A1 * | 9/2014 | Nayshtut et al. .............. 713/153 |

* cited by examiner

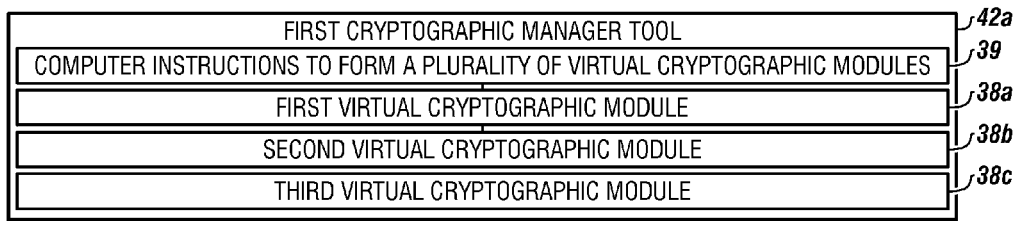
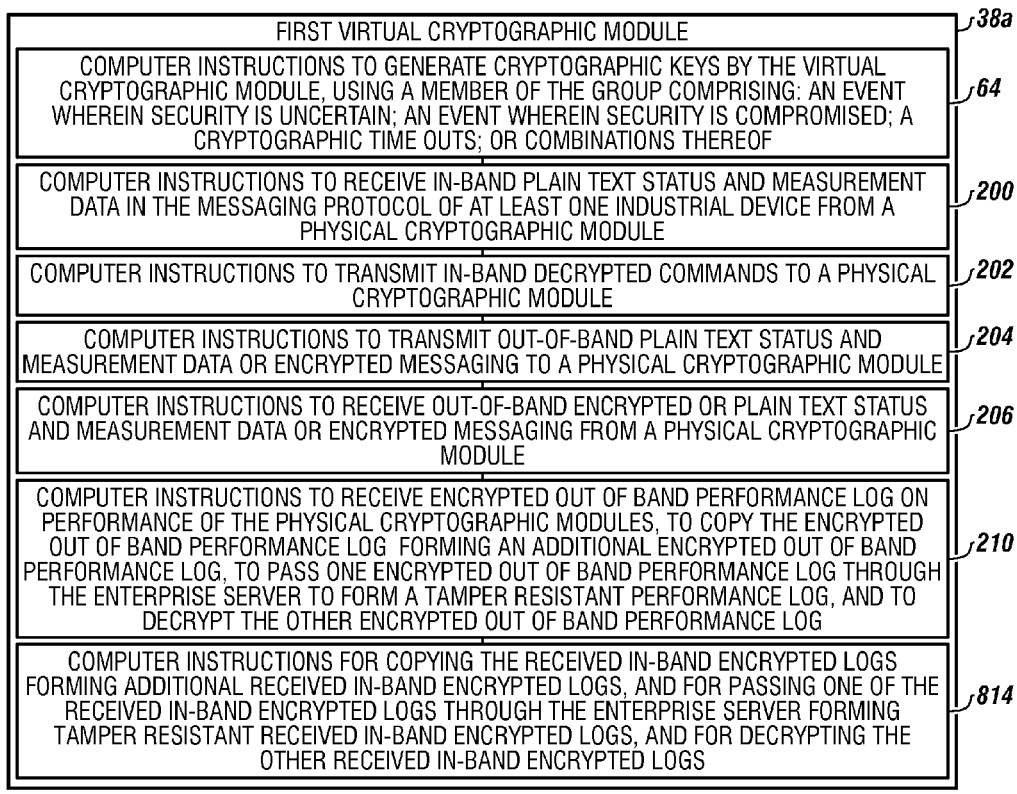

CRYPTOGRAPHIC PROTECTED COMMUNICATION SYSTEM WITH MULTIPLEXED CRYPTOGRAPHIC CRYPTOPIPE MODULES

The current application is a continuation in part of co-pending U.S. patent application Ser. No. 13/552,396 filed on Jul. 18, 2012, entitled "AUDITABLE CRYPTOGRAPHIC PROTECTED COMMUNICATION SYSTEM". This reference is hereby incorporated in its entirety.

FIELD

The present embodiments relate to an auditable cryptographic communication system which provides security between an enterprise server and industrial devices while allowing continuous configuration and reconfiguration online, with continual monitoring that provides updates without shutting off the industrial devices, without shutting off the security system, and without shutting off the enterprise server.

BACKGROUND

A need exists for a security system that can provide in-band communication to industrial devices from an enterprise server while allowing out-of-band communication between the enterprise server and the security devices, which include software termed "cryptographic manager tool," and a hardware/software product termed "physical cryptographic module."

A need exists for a high security communication system usable with a plurality of different networks simultaneously and/or consecutively, between an enterprise server and a plurality of industrial devices.

A need exists for a secure communication system that is auditable over many networks simultaneously, as the owner of an enterprise server or an industrial device may not control the intervening networks over which the communication may need to occur, which can include a radio/cellular network, the internet, a corporate network, and a local area control network consecutively or simultaneously.

A further need exists for a cryptographic communication system that provides security between an enterprise server and industrial devices, provides measurement and control data while the enterprise server continuously configures and reconfigures online one or more additional industrial devices, and allows continual monitoring without shutting off industrial devices, a security system, and/or an enterprise server.

The present embodiments meet these needs.

BRIEF DESCRIPTION OF THE DRAWINGS

The detailed description will be better understood in conjunction with the accompanying drawings as follows:

FIG. 3 depicts components of a cryptographic manager tool usable in the system of FIG. 1.

FIG. 4 depicts a diagram of a first virtual cryptographic module usable in the cryptographic communication system of FIG. 1

Figure 1:
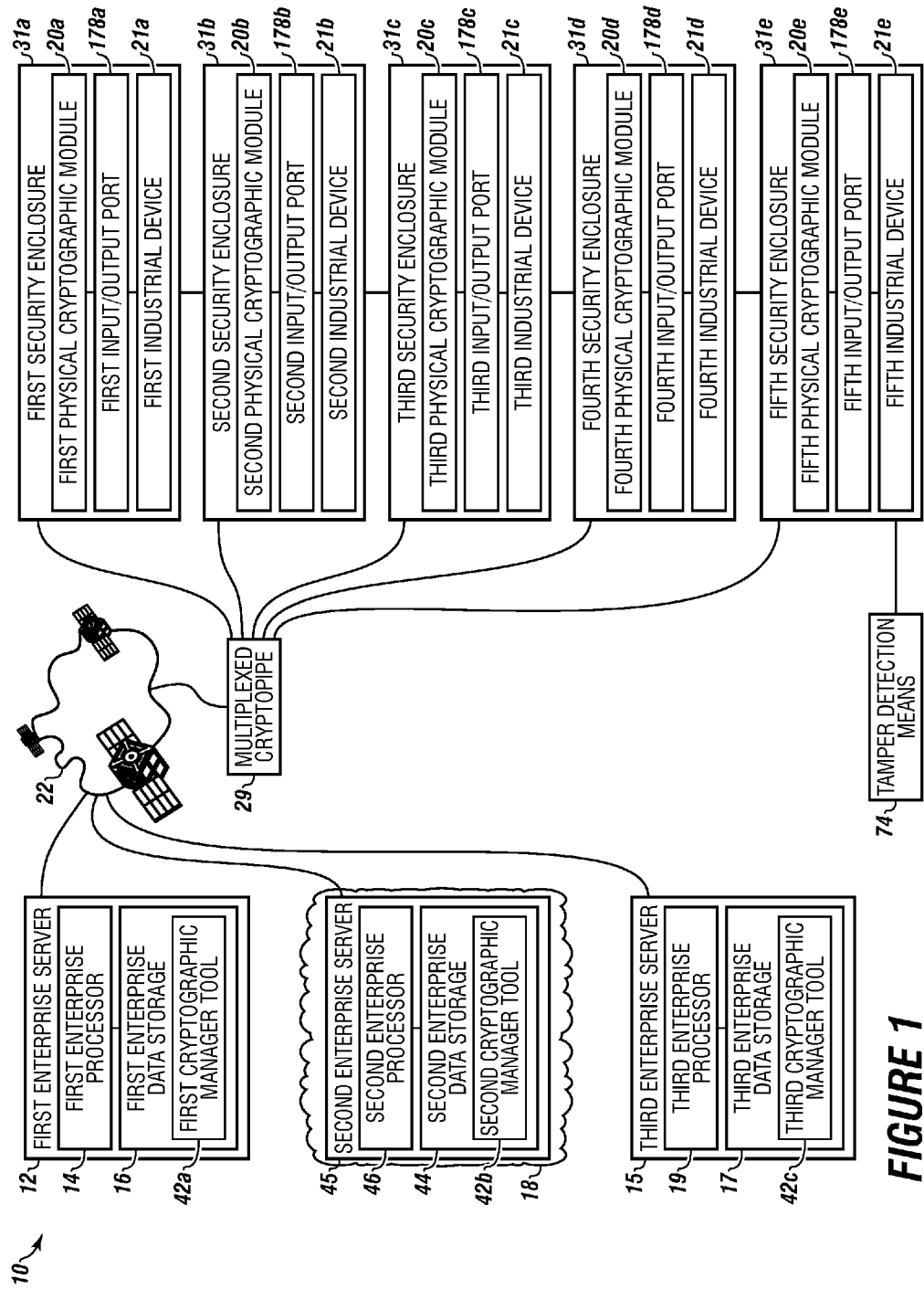
FIG. 1 depicts an overview of an auditable cryptographic communication system.

The present embodiments are detailed below with reference to the listed Figures.

DETAILED DESCRIPTION OF THE EMBODIMENTS

Before explaining the present system in detail, it is to be understood that the system is not limited to the particular embodiments and that they can be practiced or carried out in various ways.

The present embodiments relate to a cryptographic communication system, which can provide security between an enterprise server and one or more industrial devices while allowing continuous configuration and reconfiguration online of the industrial devices with continual monitoring of the industrial device using a multiplexed cryptographic pipe.

The cryptographic communication system can provide updates very often, such as, in less than 25 seconds, without shutting off all of the industrial devices of the cryptographic communication system and without shutting off a security system of the cryptographic communication system, and/or an enterprise server connected to the cryptographic communication system.

The term "out-of-band for the enterprise server" as used herein can refer to bidirectional messaging from the enterprise server to components of the cryptographic communication system which can provide security between an enterprise server and industrial devices, wherein the messaging flows through the multiplexed cryptographic pipe.

Out-of-band messaging can include commands for implementing diagnostics, testing, performing maintenance, or executing the performance steps required for components of the cryptographic communication system. Out-of-band messaging does not include commands for maintenance and performance of the industrial device to which the cryptographic communication system is connected. Out-of-band messaging can also be used for communicating historical logs that document the performance of security measures, and for messaging information concerning the generation and distribution of cryptographic keys used for validations, key exchanges, and communication sessions by the cryptographic communication system.

The term "in-band" as used herein can refer to bidirectional communication between the enterprise server and one or more connected industrial devices through the multiplexed cryptographic pipe the messaging protocol of each industrial device.

The term "out-of-band for the cryptographic manager tool" as used herein can refer to messaging from the cryptographic manager tool to a plurality of physical cryptographic modules of the cryptographic communication system.

The term "cryptographic messaging" can refer to both "in-band" and "out-of-band" messaging that can also include telemetry, which is encrypted between the virtual cryptographic module of the cryptographic manager tool and one or more of the plurality of physical cryptographic modules connected on the network.

The term "cryptographic time outs" as used herein can refer to periods of time, known in the industry as "cryptographic periods," that have been pre-established and stored in the cryptographic manager tool. They can include cryptographic manager tool settings that have been preset by a user based on best practice recommendations from cyber security authorities, such as the US government's National Institute of Standards and Technology (NIST) and corporate security policies, for encrypting information from one or more of a plurality of industrial devices based on the type of industrial device, the type of information being transmitted and/or received, and the level of terrorism or hacking that the industrial device generally experiences.

The cryptographic communication system can provide authentication or cryptographic keys. Conventionally, the generation of authentication keys or cryptographic keys has been time intensive for central processing units. The cost in performance needed to be balanced against the cost in security. Users have had to balance the time required to generate cryptographic keys against the need for cryptographic keys in communication.

The cryptographic communication system can enable the user to choose a more frequent key generation or a less frequent key generation depending on best practices, NIST standards, and/or corporate security policies while passing the communication through the multiplexed cryptographic pipe.

The cryptographic communication system can help the American economy stay operational in view of hacking attacks by controlling messaging flow through a multiplexed cryptographic pipe.

As used herein, the term "computing cloud" is an industry term and generally refers to a hosted group of servers including processors and data storage which provide a service to the auditable cryptographic protected communication system, but are not owned by the entity controlling the system.

The term "uncontrolled" as used herein can mean that the network is not within the control of the owner of the enterprise server or the owner of one or more of the industrial devices. In some cases, the enterprise server owner can also be the industrial device owner. An uncontrolled network can be unsecured and/or unencrypted.

The cryptographic communication system allows keys to be generated for critical information needed by the user and for other information as designated by the operator of the system, allowing a very fast but very secure encryption/decryption system to operate through the multiplexed cryptographic pipe between industrial devices and enterprise servers over a plurality of uncontrolled networks, simultaneously, sequentially, or combinations thereof.

The cryptographic communication system can allow a user to decide how much time the system spends generating keys, in view of the cost of having greater or lesser security, by allowing the user to select cryptographic time outs.

The system is an auditable cryptographic protected communication system for connecting an enterprise server to a plurality of industrial devices using the messaging protocol of each industrial device.

Using the messaging protocol of each industrial device, which can all be different, simultaneously, the enterprise server can transmit commands and receive status and measurement data over a network using communications divided between in-band and out-of-band communications.

Each enterprise server can have at least one enterprise processor in communication with an enterprise data storage. Each enterprise server communicates to a plurality of industrial devices simultaneously connected to the network using in-band messages via a multiplexed cryptopipe that contains multiple cryptopipes, each individual cryptopipe capable of transmitting and receiving in-band messaging.

The auditable cryptographic protected communication system can connect an enterprise server to a plurality of industrial devices using a network.

The auditable cryptographic protected communication system can use one or more enterprise servers.

Each enterprise server of the system can be located in a computing cloud or outside of a computing cloud.

Each industrial device can receive commands and transmit status and measurement data in its own unique messaging protocol through a multiplexed cryptopipe allowing multiple devices to transmit data simultaneously, and allowing a single device to perform at least three different activities simultaneously with other devices, allowing continuous operation of the system 24 hours a day, 7 days a week, without the need to shut down the entire system for reconfiguration of a single industrial device or because of a cryout, call out, or exception report produced by a single industrial device.

In one or more embodiments, the multiple industrial devices can be automated flow controllers, sensors connected to oil pipelines, sensors on oil rigs, or other types of meters, can transmit each piece of data into different cryptopipes in a multiplexed cryptopipe for ultimate safe secure transmission of in-band messaging.

The enterprise data storage can include computer instructions to form a plurality of virtual cryptographic modules.

Each of the plurality of virtual cryptographic modules can include computer instructions to receive in-band plain text status and measurement data in the messaging protocol of the industrial device from the physical cryptographic module; computer instructions to transmit in-band decrypted commands to the physical cryptographic module; computer instructions to transmit out-of-band plain text status and measurement data or encrypted messaging to the physical cryptographic module; computer instructions to receive out-of-band encrypted or plain text status and measurement data or encrypted messaging from the physical cryptographic module; and computer instructions to receive encrypted out-of-band log data on performance of the physical cryptographic modules.

Additionally, the virtual cryptographic modules can include computer instructions to generate cryptographic keys by the virtual cryptographic module, using a member of the group comprising: an event wherein security is uncertain, an event wherein security is compromised, a cryptographic time out, or combinations thereof.

In addition to the cryptographic manager tool that includes a virtual cryptographic module, the enterprise data storage can include computer instructions to form a multiplexed cryptopipe, as well as the formed multiplexed cryptopipe and computer instructions to use the multiplexed cryptopipe to communicate between the plurality of virtual cryptographic modules and the plurality of industrial devices via individual physical cryptographic modules simultaneously.

The enterprise data storage can also include computer instructions to monitor, configure and reconfigure online and on demand, continuously, multiplexed cryptographic pipe; computer instructions to monitor, configure, reconfigure online and on demand, continuously, the plurality of physical cryptographic modules, simultaneously; and computer instructions to monitor, configure, reconfigure online and on demand, continuously, the plurality of virtual cryptographic modules simultaneously.

The enterprise data storage can include a library of virtual cryptographic module settings; and a library of physical cryptographic module settings.

The library of virtual cryptographic module settings can include a member of the group consisting of: a pipe local IP address, pipe time outs, a pipe remote IP address, a pipe buffer size, a pipe listen IP address, a local port, a remote port, a pipe protocol, a pipe auto-enable, and combinations thereof.

The library of physical cryptographic modules can include a member of the group consisting of: a tag, a mac address, a lock status, a host port, a device port, closed connection time outs, inter-character time outs, a graphic user ID (GUID), a date created, a date last synched, a number of synchronization, a serial number, a status flag, a status string, a note, and combinations thereof.

The auditable communication system can include a plurality of physical cryptographic modules. Each physical cryptographic module can connect to one of the industrial devices.

Each physical cryptographic module can have a physical cryptographic module processor and a physical cryptographic module data storage connected to the physical cryptographic module processor.

Each physical cryptographic module data storage can include computer instructions to receive in-band plain text status and measurement data in the messaging protocol of the industrial device from the industrial device; computer instructions to transmit in-band decrypted commands to the industrial device, in communication therewith; computer instructions for receiving encrypted messaging in-band from the enterprise server; and computer instructions for transmitting encrypted messaging in-band to the enterprise server from the physical cryptographic module.

Each physical cryptographic module data storage can include computer instructions to receive out-of-band plain text status and measurement data or encrypted messaging from the enterprise server to the physical cryptographic module; computer instructions to transmit out-of-band plain text status and measurement data or encrypted messaging to the enterprise server; computer instructions to transmit encrypted out-of-band log data on performance of the physical cryptographic module; and computer instructions to generate cryptographic keys for: digital signatures in authentication certificates; cryptographic key exchanges; and cryptographic communication sessions between the plurality of physical cryptographic modules and the enterprise server without human intervention.

Each of the physical cryptographic modules can communicate between one of the enterprise servers and one of the industrial devices using in-band messages and a messaging protocol of each industrial device, and communicates out-of-band messages between at least one of the enterprise servers to each physical cryptographic module without shutting down the auditable communication system and while creating logs and a history of events related to the communication system, including tracking of data, cryouts, call outs, exception reports, online configuration and online reconfiguration, all in a secure, encrypted environment.

The enterprise data storage can further comprise computer instructions to form a plurality of cryptopipes as components of the multiplexed cryptopipe.

Each cryptopipe can communicate between a physical cryptographic module and the enterprise server.

In embodiments, the device communication from the industrial device can be a cryout, a callout, an exception report, an unsolicited message, or combinations thereof.

In embodiments, the enterprise data storage can further include computer instructions to manage the multiplexed cryptopipe in real time 24 hours a day, 7 days a week performing multiplexed and demultiplexed communications between the enterprise server the virtual cryptographic module.

In embodiments, the physical cryptographic module can further include computer instructions to manage the multiplexed cryptopipe in real time 24 hours a day, 7 days a week performing multiplexed and demultiplexed communications between the enterprise server and the virtual cryptographic module.

In embodiments, the enterprise data storage can include computer instructions to present the status and errors related to the multiplexed cryptopipe in real time 24 hours a day, 7 days a week tracking the multiplexed communication, demultiplexed communication, and combinations thereof; between the enterprise server and the physical cryptographic module as an executive dashboard viewable by a user.

In embodiments, the auditable cryptographic protected communication system can include a security enclosure around each physical cryptographic module with connected industrial device creating a tamperproof environment.

In embodiments, a tamper detection means can connect or be in communication to one or more security enclosures.

The tamper detection means can include a sensor, a processor connected to the sensor and a tamper detection data storage connected to the processor, containing computer instructions that detect when the security enclosure is opened; computer instructions that provide an audible alarm when the security enclosure is open; computer instructions that indicate the security enclosure is open; computer instructions that provide a visual alarm when the security enclosure is open; computer instructions that active a digital alarm and notification system when the security enclosure is open, and further provide provides a message to a user via a network.

In embodiments, a cryout can be defined to be an electronic messaging alarm, an activated automated phone call, an exception report, a text message, an email or combinations thereof.

In embodiments, the enterprise data storage can include a library of cryptographic module protocols for out-of-band communication with the cryptographic manager tool.

In embodiments, the host port of the system can be an RS232 port, an RS485 port, an RS422 port, an Ethernet port, a TCPIP port, or a mesh radio network port.

In embodiments, the device port can be an RS232 port, an RS485 port, an RS422 port, an Ethernet port, a TCPIP port, or a mesh radio network port.

In embodiments, the out-of-band encrypted log information with status and measurement data from the physical cryptographic module can simultaneously include information that indicates performance and a breach of security.

In embodiments, the enterprise server can communicate simultaneously, consecutively, or combinations thereof with the plurality of industrial devices over a plurality of different networks, from a computing cloud, or combinations thereof.

In embodiments, the plurality of different networks can simultaneously, consecutively, or combinations thereof be comprised of a radio/cellular network, a worldwide network, satellite network, a corporate network, and a local area control network.

Turning now to the Figures, FIG. 1 depicts an auditable cryptographic protected communication system 10.

The auditable cryptographic protected communication system 10 can include a first enterprise server 12, a second enterprise server 45, and a third enterprise server 15. The second enterprise server 45 can be in a computing cloud 18.

The auditable cryptographic protected communication system 10 can include one or more security enclosures, such as a first security enclosure 31a, a second security enclosure 31b, a third security enclosure 31c, a fourth security enclosure 31d, and a fifth security enclosure 31e.

The first security enclosure 31a can contain a first physical cryptographic module 20a, a first input/output port 178a, and a first industrial device 21a. The first input/output port 178a can provide communication between the first physical cryptographic module 20a and the first industrial device 21a.

The second security enclosure 31b can contain a second physical cryptographic module 20b, a second input/output port 178b, and a second industrial device 21b. The second input/output port 178b can provide communication between the second physical cryptographic module 20b and the second industrial device 21b.

The third security enclosure 31c can contain a third physical cryptographic module 20c, a third input/output port 178c, and a third industrial device 21c. The third input/output port 178c can provide communication between the third physical cryptographic module 20c and the third industrial device 21c.

The fourth security enclosure 31d can contain a fourth physical cryptographic module 20d, a fourth input/output port 178d, and a fourth industrial device 21d. The fourth input/output port 178d can provide communication between the fourth physical cryptographic module 20d and the fourth industrial device 21d.

The fifth security enclosure 31e can contain a fifth physical cryptographic module 20e, a fifth input/output port 178e, and a fifth industrial device 21e. The fifth input/output port 178e can provide communication between the fifth physical cryptographic module 20e and the fifth industrial device 21e.

The first industrial device 21a, the second industrial device 21b, third industrial device 21c, fourth industrial device 21d, and fifth industrial device 21e can communicate with a network 22 using a multiplexed cryptopipe 29.

The first enterprise server 12, the second enterprise server 45, and the third enterprise server 15 can also be in communication with the network 22.

The auditable cryptographic protected communication system 10 can enable one or more enterprise servers, such as the first enterprise server 12, the second enterprise server 45, and the third enterprise server 15, to receive in-band and out-of-band communications in a special order, as well as to receive messaging from the industrial devices that logs communication events from the industrial devices and for the overall system.

The first enterprise server 12 can have a first enterprise processor 14 and a first enterprise data storage 16 that can be used for storing a first cryptographic manager tool 42a.

The second enterprise server 45 can have a second enterprise processor 46 and a second enterprise data storage 44 that can be used for storing a second cryptographic manager tool 42b.

The third enterprise server 15 can have a third enterprise processor 19 and a third enterprise data storage 17 that can be used for storing a third cryptographic manager tool 42c.

The first enterprise server 12, the second enterprise server 45, and the third enterprise server 15 can be connected via a network 22. The network 22 can be the internet, a satellite network, a cellular network, a local area network, a wide area network, a similar network, or combinations thereof.

The first enterprise server 12, the second enterprise server 45, and the third enterprise server 15, or combinations thereof can communicate using in-band and out-of-band messages to one or more physical cryptographic modules of a plurality of physical cryptographic modules, such as a first physical cryptographic module 20a, a second physical cryptographic module 20b, a third physical cryptographic module 20c, a fourth physical cryptographic module 20d, and a fifth physical cryptographic module 20e using the multiplexed cryptopipe 29.

The term "multiplexed cryptopipe" refers to an encrypted messaging pipeline that contains multiple cryptopipes.

The term "cryptographic pipe" as used herein can refer to a virtual pipe connecting the physical cryptographic module to the enterprise server and can refer to software programs with unique computer instructions and combinations thereof.

Each physical cryptographic module can have a physical cryptographic module processor that can be connected to a physical cryptographic module data storage.

The first physical cryptographic module 20a can be in direction communication with the first industrial device 21a, the second physical cryptographic module 20b can be in direct communication with the second industrial device 21b, the third physical cryptographic module 20c can be in direct communication with the third industrial device 21c, the fourth physical cryptographic module 20d can be in direct communication with the fourth industrial device 21d, and the fifth physical cryptographic module 20e can be in direct communication with the fifth industrial device 21e.

The first enterprise server 12 can transmit commands to all the industrial devices 21a, 21b, 21c, 21d, and 21e simultaneously or in sequence using the respective messaging protocols of each individual industrial device 21a-21e using the first cryptographic manager tool 42a.

The industrial devices 21a-21e can receive commands simultaneously in the unique messaging protocols of each of the individual industrial devices and each industrial device could have a different messaging protocol.

A special feature of the communication system is that a first industrial device 21a can have a first messaging protocol, and a second industrial device 21b can have a second messaging protocol, yet the industrial devices 21a and 21b can transmit status and measurement data in unique messaging protocols over one or more networks 22 to the enterprise server securely through the multiplexed cryptopipe simultaneously for secure encrypted communication that a terrorist cannot hack, safeguarding American pipelines from terrorism.

The network 22 can be dissimilar networks, similar networks, or combinations thereof. The network 22 can be an uncontrolled network.

The third physical cryptographic module 20c is shown with a third input/output port 178c, the fourth physical cryptographic module is shown with a fourth input/output port 178d, and the fifth physical cryptographic module is shown with a fifth input/output port 178e.

In one or more embodiments, the physical cryptographic modules can have any number of input/output ports.

In this embodiment, security enclosure 31e is shown in communication with a tamper detection means 74.

Figure 2:
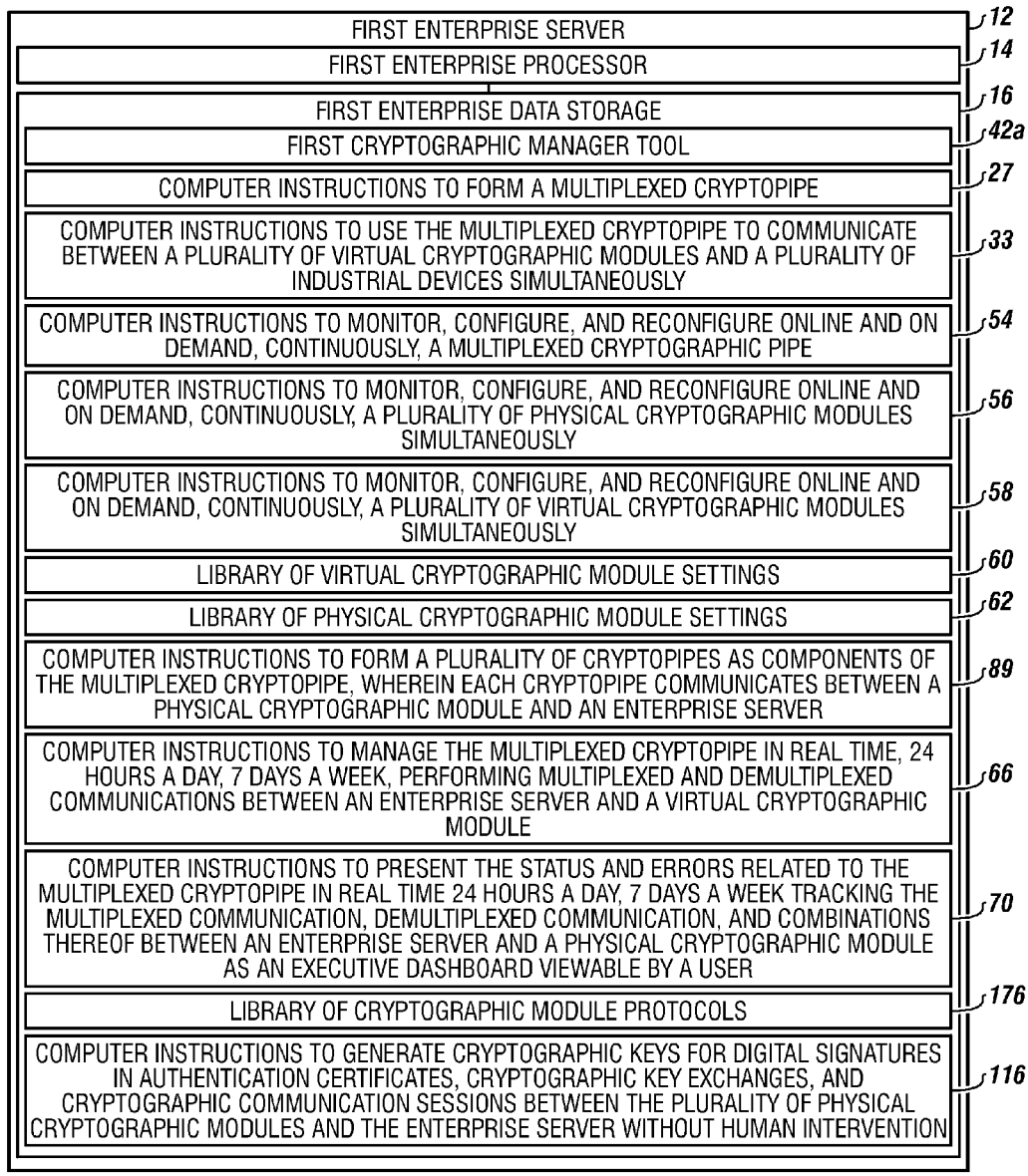
FIG. 2 depicts a diagram of an enterprise data storage usable in the auditable cryptographic communication system.

FIG. 2 depicts the computer instructions in the first enterprise data storage, which can be located and/or spread over several enterprise data storages simultaneously in different embodiments.

The first cryptographic manager tool 42a is shown located in the first enterprise data storage 16, which is located in the first enterprise processor 14, which is located in the first enterprise server 12.

The first cryptographic manager tool 42a can handle up to 2,000 industrial devices simultaneously.

The first enterprise data storage 16 can include computer instructions 27 to form a multiplexed cryptopipe.

The first enterprise data storage 16 can include computer instructions 33 to use the multiplexed cryptopipe to communicate between a plurality of virtual cryptographic modules and a plurality of industrial devices simultaneously.

The first enterprise data storage 16 can include computer instructions 54 to monitor, configure, and reconfigure online and on demand, continuously, a multiplexed cryptographic pipe.

The first enterprise data storage 16 can include computer instructions 56 to monitor, configure, and reconfigure online and on demand, continuously, a plurality of physical cryptographic modules simultaneously.

The first enterprise data storage 16 can include computer instructions 58 to monitor, configure, and reconfigure online and on demand, continuously, a plurality of virtual cryptographic modules simultaneously.

The first enterprise data storage 16 can include the library of virtual cryptographic module settings 60, which can include, but is not limited to: a pipe local IP address, a pipe time out, a pipe remote IP address, a pipe buffer size, a pipe listen IP address, a local port, a remote port, a pipe protocol, a pipe auto-enable, and multiples or combinations thereof.

The first enterprise data storage 16 can include the library of physical cryptographic module settings 62, which can include, but is not limited to: a tag; a mac address; a lock status, such as a memory lock; a host port; a device port; and combinations of these settings. The host port can be an RS232 port, an RS485 port, an RS422 port, an Ethernet port, a TCPIP port, a mesh radio network, and combinations thereof. The device port can have the same kinds of ports as the host port.

The library of physical cryptographic module settings can be in the enterprise server, and can also include, but is not limited to: a closed connection time out, inter-character time outs, a graphic user ID (GUID), a date created, a date last synched, a number of synchronization, a serial number, a status flag, a status string, notes, and combinations thereof.

The first enterprise data storage 16 can include computer instructions 89 to form a plurality of cryptopipes as components of the multiplexed cryptopipe, wherein each cryptopipe communicates between a physical cryptographic module and an enterprise server.

The first enterprise data storage 16 can include computer instructions 66 to manage the multiplexed cryptopipe in real time, 24 hours a day, 7 days a week, performing multiplexed and demultiplexed communications between an enterprise server and a virtual cryptographic module.

The first enterprise data storage 16 can include computer instructions 70 to present the status and errors related to the multiplexed cryptopipe in real time 24 hours a day, 7 days a week tracking the multiplexed communication, demultiplexed communication, and combinations thereof between an enterprise server and a physical cryptographic module as an executive dashboard viewable by a user.

The first enterprise data storage 16 can include a library of cryptographic module protocols 176 for out-of-band communication with the cryptographic manager tool.

The first enterprise data storage 16 can include computer instructions 116 to generate cryptographic keys for digital signatures in authentication certificates, cryptographic key exchanges, and cryptographic communication sessions between the plurality of physical cryptographic modules and the enterprise server without human intervention.

FIG. 3 depicts a diagram of the first cryptographic manager tool.

The first cryptographic manager tool 42a can have computer instructions 39 to form a plurality of virtual cryptographic modules.

In one or more embodiments, the first cryptographic manager tool 42a can also have a first virtual cryptographic module 38a, a second virtual cryptographic module 38b, and a third virtual cryptographic module 38c.

In one or more embodiments, any number of virtual cryptographic modules can be used.

FIG. 4 provides a diagram of a virtual cryptographic module.

The first virtual cryptographic module 38a can include computer instructions 64 to generate cryptographic keys by the virtual cryptographic module, using a member of the group comprising: an event wherein security is uncertain; an event wherein security is compromised; a cryptographic time outs; or combinations thereof.

The first virtual cryptographic module 38a can include computer instructions 200 to receive in-band plain text status and measurement data in the messaging protocol of at least one industrial device from a physical cryptographic module.

The first virtual cryptographic module 38a can include computer instructions 202 to transmit in-band decrypted commands to a physical cryptographic module.

The first virtual cryptographic module 38a can include computer instructions 204 to transmit out-of-band plain text status and measurement data or encrypted messaging to a physical cryptographic module.

The first virtual cryptographic module 38a can include computer instructions 206 to receive out-of-band encrypted or plain text status and measurement data or encrypted messaging from a physical cryptographic module.

The first virtual cryptographic module 38a can include computer instructions 210 to receive encrypted out-of-band performance log on performance of the physical cryptographic modules, to copy the encrypted out-of-band performance log forming an additional encrypted out-of-band performance log, to pass one encrypted out-of-band performance log through the enterprise server to form a tamper resistant performance log, and to decrypt the other encrypted out-of-band performance log.

The first virtual cryptographic module 38a can also include computer instructions 814 for copying the received in-band encrypted logs forming additional received in-band encrypted logs, and for passing one of the received in-band encrypted logs through the enterprise server forming tamper resistant received in-band encrypted logs, and for decrypting the other received in-band encrypted logs.

Figure 5:
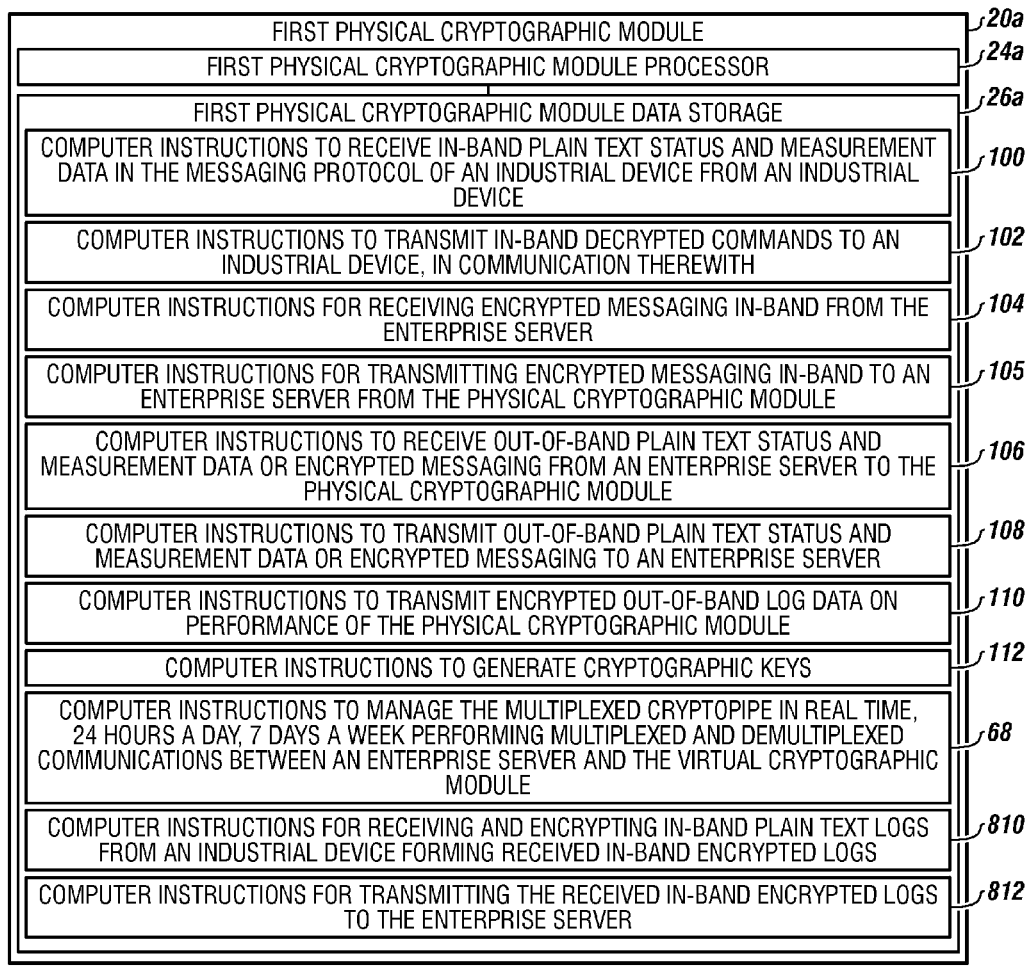
FIG. 5 depicts a diagram of a physical cryptographic module usable in the auditable cryptographic communication system.

FIG. 5 shows a diagram of the first physical cryptographic module.

The first physical cryptographic module 20a can have a first physical cryptographic module processor 24a that can connect to a first physical cryptographic module data storage 26a.

Each physical cryptographic module previously described can have a physical cryptographic module processor that can be connected to a physical cryptographic module data storage.

The first physical cryptographic module 20a can include computer instructions 100 to receive in-band plain text status and measurement data in the messaging protocol of an industrial device from an industrial device.

The first physical cryptographic module 20a can include computer instructions 102 to transmit in-band decrypted commands to an industrial device, in communication therewith.

The first physical cryptographic module 20a can include computer instructions 104 for receiving encrypted messaging in-band from the enterprise server.

The first physical cryptographic module 20a can include computer instructions 105 for transmitting encrypted messaging in-band to an enterprise server from the physical cryptographic module.

The first physical cryptographic module 20a can include computer instructions 106 to receive out-of-band plain text status and measurement data or encrypted messaging from an enterprise server to the physical cryptographic module.

The first physical cryptographic module 20a can include computer instructions 108 to transmit out-of-band plain text status and measurement data or encrypted messaging to an enterprise server.

The first physical cryptographic module 20a can include computer instructions 110 to transmit encrypted out-of-band log data on performance of the physical cryptographic module.

The first physical cryptographic module 20a can include computer instructions 112 to generate cryptographic keys.

The first physical cryptographic module 20a can include computer instructions 68 to manage the multiplexed cryptopipe in real time, 24 hours a day, 7 days a week performing multiplexed and demultiplexed communications between an enterprise server and the virtual cryptographic module.

The physical cryptographic modules can provide a communication path allowing for the industrial devices to communicate through in-band and/or out-of-band messages with the additional enterprise servers simultaneously.

As an example, an in-band plain text message from the first physical cryptographic module to an industrial device can be a command to send status and measurement data.

As an example of an in-band decrypted command to an industrial device which is decrypted by the first physical cryptographic module can be a command that opens a certain valve.

In an embodiment, the physical cryptographic module data storage computer instructions to generate keys creates keys for digital signatures in authentication certificates, cryptographic key exchanges, and cryptographic communication sessions between the plurality of physical cryptographic modules and the enterprise server without human intervention. An example of a cryptographic key can be a public key to decrypt a digital signature on an authentication certificate.

The first physical cryptographic module data storage 26a can include computer instructions 810 for receiving and encrypting in-band plain text logs from an industrial device forming received in-band encrypted logs.

The first physical cryptographic module data storage 26a can include computer instructions 812 for transmitting the received in-band encrypted logs to the enterprise server.

Figure 6:
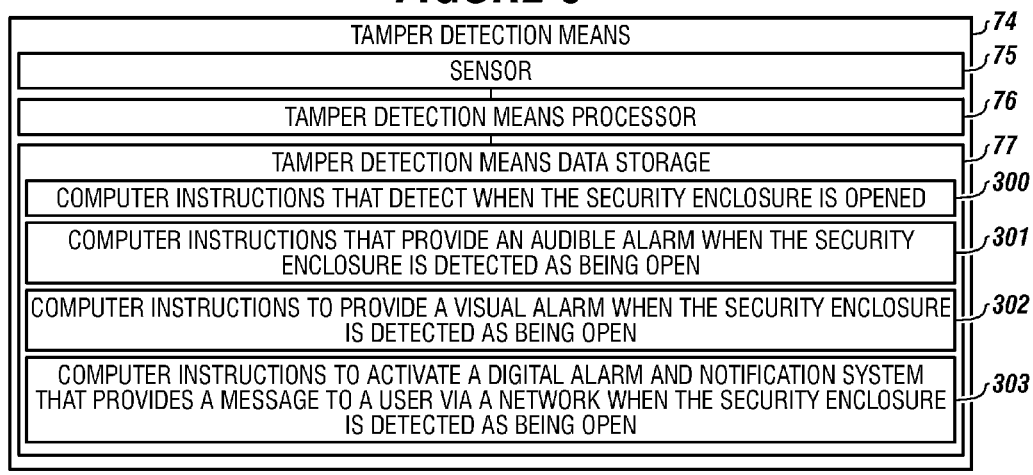
FIG. 6 depicts a diagram of a tamper detection means usable in the cryptographic communication system.

FIG. 6 depicts a diagram of a tamper detection means.

The tamper detection means 74 can include a sensor 75 that can be connected to one of the security enclosures. The sensor 75 can connect or be in communication with a tamper detection means processor 76.

The tamper detection means processor 76 can have tamper detection means data storage 77 that can contain computer instructions to communicate one of a variety of messages as mentioned earlier to a user, including but not limited to an audio alarm, a visual alarm and activation of an alarm notification system which can notify a user, such as by an email or text a message directly to a client device of a user.

The tamper detection means data storage 77 can include computer instructions 300 that detect when the security enclosure is opened.

The tamper detection means data storage 77 can include computer instructions 301 that provide an audible alarm when the security enclosure is detected as being open.

The tamper detection means data storage 77 can include computer instructions 302 to provide a visual alarm when the security enclosure is detected as being open.

The tamper detection means data storage 77 can include computer instructions 303 to activate a digital alarm and notification system that provides a message to a user via a network when the security enclosure is detected as being open.

While these embodiments have been described with emphasis on the embodiments, it should be understood that within the scope of the appended claims, the embodiments might be practiced other than as specifically described herein.

What is claimed is:

1. An auditable cryptographic protected communication system for connecting an enterprise server to a plurality of industrial devices, each industrial device using at least one messaging protocol for each industrial device enabling the industrial devices to receive commands and transmit status and measurement data using the at least one messaging protocol for each industrial device over a network, wherein the auditable cryptographic protected communication system comprises:
   a. at least one enterprise server having at least one enterprise processor and an enterprise data storage, wherein the at least one enterprise server communicates to a plurality of industrial devices connected to the network using in-band messages using a multiplexed cryptopipe;
   b. computer instructions in the enterprise data storage comprising:
      (i) a cryptographic manager tool in the enterprise data storage comprising:
         1. computer instructions to form a plurality of virtual cryptographic modules;
         2. a plurality of virtual cryptographic modules wherein each virtual cryptographic module comprises:
            i. computer instructions to receive in-band plain text status and measurement data in the messaging protocol of the industrial device from the physical cryptographic module;
            ii. computer instructions to transmit in-band decrypted commands to the physical cryptographic module;
            iii. computer instructions to transmit out-of-band plain text status and measurement data or encrypted messaging to the physical cryptographic module;
            iv. computer instructions to receive out-of-band encrypted or plain text status and measurement data or encrypted messaging from the physical cryptographic module;
            v. computer instructions to receive encrypted out-of-band performance log on performance of the physical cryptographic modules, to copy the encrypted out-of-band performance log forming an additional encrypted out-of-band performance log, to pass one encrypted out-of-band performance log through the enterprise server to form a tamper resistant performance log, and to decrypt the other encrypted out-of-band performance log;
            vi. computer instructions to generate cryptographic keys by the virtual cryptographic module, using a member of the group comprising: an event wherein security is uncertain; an event wherein security is compromised; a cryptographic time outs; or combinations thereof;
      (ii) computer instructions to form a multiplexed cryptopipe;
      (iii) a multiplexed cryptopipe;
      (iv) computer instructions to use the multiplexed cryptopipe to communicate between the plurality of virtual cryptographic modules and the plurality of industrial devices simultaneously;
      (v) computer instructions to monitor, configure and reconfigure online and on demand, continuously, multiplexed cryptographic pipe;

(vi) computer instructions to monitor, configure, reconfigure online and on demand, continuously, the plurality of physical cryptographic modules, simultaneously;
(vii) computer instructions to monitor, configure, reconfigure online and on demand, continuously, the plurality of virtual cryptographic modules simultaneously;
(viii) a library of virtual cryptographic module settings; and
(ix) a library of physical cryptographic module settings;
c. a plurality of physical cryptographic modules, wherein one of the physical cryptographic module connects to one of the industrial devices, and wherein, each physical cryptographic module comprises:
  (i) a physical cryptographic module processor;
  (ii) a physical cryptographic module data storage connected to the physical cryptographic module processor, wherein the physical cryptographic module data storage comprises:
    1. computer instructions to receive in-band plain text status and measurement data in the messaging protocol of the industrial device from the industrial device;
    2. computer instructions to transmit in-band decrypted commands to the industrial device, in communication therewith;
    3. computer instructions for receiving encrypted messaging in-band from the enterprise server;
    4. computer instructions for transmitting encrypted messaging in-band to the enterprise server from the physical cryptographic module;
    5. computer instructions to receive out-of-band plain text status and measurement data or encrypted messaging from the enterprise server to the physical cryptographic module;
    6. computer instructions to transmit out-of-band plain text status and measurement data or encrypted messaging to the enterprise server;
    7. computer instructions to transmit encrypted out-of-band log data on performance of the physical cryptographic module; and
    8. computer instructions to generate cryptographic keys for:
      i. digital signatures in authentication certificates;
      ii. cryptographic key exchanges; and
      iii. cryptographic communication sessions between the plurality of physical cryptographic modules and the enterprise server without human intervention;
d. wherein each of the physical cryptographic modules communicates between one of the enterprise servers and one of the industrial devices using in-band messages and a messaging protocol of each industrial device, and communicates out-of-band messages between at least one of the enterprise servers to each physical cryptographic module.

2. The auditable cryptographic protected communication system of claim 1, wherein the enterprise data storage further comprises: computer instructions to form a plurality of cryptopipes as components of the multiplexed cryptopipe, wherein each cryptopipe communicates between a physical cryptographic module and the enterprise server.

3. The auditable cryptographic protected communication system of claim 1, wherein the device communication from the industrial device comprises:
  a. a cryout;
  b. a callout;
  c. an exception report;
  d. an unsolicited message; and
  e. combinations thereof.

4. The auditable cryptographic protected communication system of claim 1, wherein the enterprise data storage further comprises computer instructions to manage the multiplexed cryptopipe in real time 24 hours a day, 7 days a week performing multiplexed and demultiplexed communications between the enterprise server and the virtual cryptographic module.

5. The auditable cryptographic protected communication system of claim 1, wherein the physical cryptographic module further comprising computer instructions to manage the multiplexed cryptopipe in real time 24 hours a day, 7 days a week performing multiplexed and demultiplexed communications between the enterprise server and the virtual cryptographic module.

6. The auditable cryptographic protected communication system of claim 1, further comprising computer instructions in the enterprise data storage to present the status and errors related to the multiplexed cryptopipe in real time 24 hours a day, 7 days a week tracking the multiplexed communication, demultiplexed communication, and combinations thereof; between the enterprise server and the physical cryptographic module as an executive dashboard viewable by a user.

7. The auditable cryptographic protected communication system of claim 1, further comprising a security enclosure around each physical cryptographic module with connected industrial device creating a tamperproof environment.

8. The auditable cryptographic protected communication system of claim 7, further comprising a tamper detection means connected to the security enclosure, wherein the tamper detection means comprises a sensor, a processor connected to the sensor and a tamper detection means data storage connected to the processor, wherein the tamper detection data storage comprises:
  a. computer instructions that detect when the security enclosure is opened;
  b. computer instructions that provide an audible alarm when computer instructions indicate the security enclosure is open;
  c. computer instructions provide a visual alarm when computer instructions indicate the security enclosure is open; and
  d. computer instructions activate a digital alarm and notification system that provides a message to a user via a network that computer instructions have detected that the security enclosure is open.

9. The auditable cryptographic protected communication system of claim 3, wherein the cryout is an electronic messaging alarm, an activated automated phone call, an exception report, a text message, an email or combinations thereof.

10. The auditable cryptographic protected communication system of claim 1, wherein the enterprise data storage comprises a library of cryptographic module protocols for out-of-band communication with the cryptographic manager tool.

11. The auditable cryptographic protected communication system of claim 1, wherein the library of virtual cryptographic module settings includes a member of the group consisting of: a pipe local IP address, pipe time outs, a pipe remote IP address, a pipe buffer size, a pipe listen IP address, a local port, a remote port, a pipe protocol, a pipe auto-enable, and combinations thereof.

12. The auditable cryptographic protected communication system of claim 1, wherein the library of physical cryptographic module settings includes a member of the group consisting of: a tag, a mac address, a lock status, a host port, a device port, closed connection time outs, inter-character time outs, a graphic user ID (GUID), a date created, a date last synched, a number of synchronization, a serial number, a status flag, a status string, a note, and combinations thereof.

13. The auditable cryptographic protected communication system of claim 12, wherein the host port is an RS232 port, an RS485 port, an RS422 port, an Ethernet port, a TCPIP port, or a mesh radio network port.

14. The auditable cryptographic protected communication system of claim 12, wherein the device port is an RS232 port, an RS485 port, an RS422 port, an Ethernet port, a TCPIP port, or a mesh radio network port.

15. The auditable cryptographic protected communication system of claim 1, wherein the out-of-band encrypted log information with status and measurement data from the physical cryptographic module comprises performance information and information that indicates a breach of security simultaneously.

16. The auditable cryptographic protected communication system of claim 1, wherein the enterprise server communicates with the plurality of industrial devices over a plurality of different networks simultaneously, consecutively, or combinations thereof or from a computing cloud, or combinations thereof.

17. The auditable cryptographic protected communication system of claim 16, wherein the plurality of different networks simultaneously, consecutively or combinations thereof comprise: a radio/cellular network, a worldwide network, satellite network, a corporate network, and a local area control network.

18. The auditable cryptographic protected communication system of claim 1, wherein the physical cryptographic module data storage further comprises computer instructions for receiving and encrypting in-band plain text logs from an industrial device forming received in-band encrypted logs.

19. The auditable cryptographic protected communication system of claim 18, wherein the physical cryptographic module data storage further comprises computer instructions for transmitting the received in-band encrypted logs to the enterprise server.

20. The auditable cryptographic protected communication system of claim 19, wherein the enterprise data storage further comprises computer instructions for copying the received in-band encrypted logs forming additional received in-band encrypted logs, and for passing one of the received in-band encrypted logs through the enterprise server forming tamper resistant received in-band encrypted logs, and for decrypting the other received in-band encrypted logs.

* * * * *